United States Patent
Nitz et al.

(10) Patent No.: US 11,380,015 B2
(45) Date of Patent: Jul. 5, 2022

(54) METHOD FOR THE OPTICAL DETERMINATION OF AN INTENSITY DISTRIBUTION

(71) Applicant: Fraunhofer-Gesellschaft zur Förderung der angewandten Forschung e.V., Munich (DE)

(72) Inventors: Peter Nitz, Freiburg (DE); Anna Heimsath, Freiburg (DE); Peter Schoettl, Freiburg (DE); Gregor Bern, Freiburg (DE); Moritz Bitterling, Freiburg (DE); Thomas Schmidt, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/209,355

(22) Filed: Mar. 23, 2021

(65) Prior Publication Data
US 2021/0295562 A1    Sep. 23, 2021

(30) Foreign Application Priority Data
Mar. 23, 2020    (DE) .......................... 102020107965.6

(51) Int. Cl.
*H04N 5/235*    (2006.01)
*G06T 7/80*     (2017.01)

(52) U.S. Cl.
CPC ............. *G06T 7/80* (2017.01); *H04N 5/2354* (2013.01); *G06T 2207/10152* (2013.01)

(58) Field of Classification Search
CPC ................... H04N 5/2354; G06T 7/80; G06T 2207/10152
See application file for complete search history.

(56) References Cited

U.S. PATENT DOCUMENTS

| 5,463,666 A | * | 10/1995 | Eberhard | ............. G01N 23/046 378/4 |
| 6,141,104 A | * | 10/2000 | Schulz | .................. G06F 3/0304 356/616 |

(Continued)

*Primary Examiner* — Zaihan Jiang
(74) *Attorney, Agent, or Firm* — Volpe Koenig

(57) ABSTRACT

A method for the optical determination of an intensity distribution, includes a) producing a spatially inhomogeneous radiation field of electromagnetic radiation; b) producing a first relative movement between a position-resolving image sensor and the radiation source with the radiation field moving along a first measurement path over a sensor field of the image sensor, so it is scanned by a first measurement path region of the radiation field; c) recording a first image set with position-resolved images of the radiation field during the first movement; d) producing a similar second relative movement between the image sensor and the radiation source, along a second measurement path not parallel to the first movement path; d) similarly recording a second image set during the second relative movement; e) evaluating the position-resolved images of the first and second image sets at least at points of intersection, the locations of which are defined by evaluation lines; and f) determining a relative intensity distribution based on points of intersection of the evaluation lines to characterize the image sensor and/or the radiation field.

12 Claims, 3 Drawing Sheets

(56) References Cited

U.S. PATENT DOCUMENTS

| | | | |
|---|---|---|---|
| 6,239,424 B1 | 5/2001 | Kuo | |
| 2002/0033454 A1* | 3/2002 | Cheng | A61B 5/14546 |
| | | | 250/339.12 |
| 2002/0051245 A1* | 5/2002 | Takase | H04N 1/113 |
| | | | 358/484 |
| 2003/0128344 A1* | 7/2003 | Nishi | G03F 7/70358 |
| | | | 356/399 |
| 2004/0021845 A1* | 2/2004 | Kawahara | G03F 7/70091 |
| | | | 430/311 |
| 2004/0246274 A1 | 12/2004 | Rykowski et al. | |
| 2005/0122549 A1* | 6/2005 | Goulanian | G03H 1/30 |
| | | | 359/3 |
| 2006/0023068 A1 | 2/2006 | Archer et al. | |
| 2007/0067104 A1* | 3/2007 | Mays | G01C 21/3647 |
| | | | 701/437 |
| 2008/0006770 A1* | 1/2008 | Shiea | H01J 49/165 |
| | | | 250/288 |
| 2010/0188500 A1* | 7/2010 | Bouchard | G01N 21/8901 |
| | | | 348/370 |
| 2011/0261164 A1* | 10/2011 | Olesen | G06T 7/0012 |
| | | | 382/128 |
| 2012/0020082 A1* | 1/2012 | Shinohara | G02B 19/0071 |
| | | | 362/235 |
| 2014/0184813 A1 | 7/2014 | Cohen et al. | |
| 2015/0347817 A1* | 12/2015 | Valvik | H04N 13/296 |
| | | | 382/133 |
| 2017/0292916 A1* | 10/2017 | Yang | G01N 21/8806 |
| 2018/0284033 A1* | 10/2018 | Legros | G01N 21/8901 |
| 2018/0286298 A1 | 10/2018 | Levin et al. | |
| 2018/0357796 A1* | 12/2018 | Bishop | A61B 3/1025 |

\* cited by examiner

METHOD FOR THE OPTICAL DETERMINATION OF AN INTENSITY DISTRIBUTION

INCORPORATION BY REFERENCE

The following documents are incorporated herein by reference as if fully set forth: German Patent Application No. DE 10 2020 107 965.6, filed Mar. 23, 2020.

BACKGROUND

For many applications, it is desirable to determine an intensity distribution of a spatially inhomogeneous radiation field.

This is the case, for example, in applications for which a position-resolving image sensor is intended to be calibrated. Such processes are, for example, known in photography as white image correction. In this case, in one simple configuration of a white image correction, an emitting surface with a homogeneous radiation field is assumed, and differences in the signals of the individual image sensors are evaluated as a systematic error and correspondingly corrected in subsequent use of the camera.

Applications are likewise known in which the inhomogeneity of the radiation field is intended to be determined. In this case, conversely, a homogeneously receiving or calibrated position-resolved image sensor is assumed, so that positional differences in the detected intensity can be assigned to an inhomogeneity of the radiation field.

Methods for measuring the white image of a camera are known from US 2014/184813. Methods for measuring the emission behavior of a display are known from US 2004/246274.

SUMMARY

The object of the present invention is to provide a method for the optical determination of an intensity distribution which is economical and at the same time not susceptible to errors.

This object is achieved by a method having one or more of the features disclosed herein. Advantageous configurations may be found in the description that follows as well as the claims.

The method according to the invention for the optical determination of an intensity distribution comprises the following method steps:

A) production of a spatially inhomogeneous radiation field of electromagnetic radiation by an active or passive radiation source;

B) production of a first relative movement between a position-resolving image sensor and the radiation source, so that the radiation field moves along a first measurement path over a sensor field of the image sensor, so that the image sensor is scanned by a first measurement path region of the radiation field;

C) recording of a first image set comprising a multiplicity of position-resolved images of the radiation field by the image sensor during the first relative movement;

D) production of a second relative movement between the image sensor and the radiation source, so that the radiation field moves along a second measurement path over the sensor field of the image sensor, so that the image sensor is scanned by a second measurement path region of the radiation field, the second measurement path being different to the first measurement path and being selected in such a way that the first movement path is not parallel to the second movement path at least in some regions;

E) recording of a second image set comprising a multiplicity of position-resolved images of the radiation field by the image sensor during the second relative movement;

F) evaluation of the position-resolved images of the first and second image sets at least at points of intersection, the locations of which are defined by evaluation lines, a first group of evaluation lines being specified and/or determined within the first measurement path region and at least one second group of evaluation lines being specified and/or determined within the second measurement path region, at least the first group comprising at least two evaluation lines which are at a distance from one another, and each evaluation line of the first group having a point of intersection with at least one evaluation line of the second group, a characteristic gray value respectively being determined for each image set at least for each point of intersection;

G) determination of a relative intensity distribution at least on a subset of the points of intersection in order to characterize the image sensor and/or the radiation field.

The method according to the invention differs fundamentally from the methods known from the prior art: while a homogeneous radiation field for the calibration of a position-resolving image sensor or a calibrated image sensor for characterizing the homogeneity of a radiation field is assumed in the prior art, in the method according to the invention position-resolved images are recorded during a movement along a first measurement path and along at least one second measurement path. Characteristic gray values are determined at points of intersection of evaluation lines. The gray values at least at the points of intersection therefore correspond to an identical configuration between the radiation field and the image sensor, so that the measurements must be based on an identical absolute value of the radiation field. For example, it is therefore possible to set up a system of equations which is at least determined on the basis of the at least two evaluation lines of the first group, and is preferably overdetermined in the case of a plurality of evaluation lines of the second group, so that the intensity distribution can be determined with methods known per se, for example minimization algorithms. In this way, the assumption of a homogeneous radiation field or the use of a calibrated camera may be obviated.

A position-resolving image sensor is used. It comprises a multiplicity of partial sensors, each of which covers a subregion of a sensor surface of the image sensor. These partial sensors are also referred to as pixels or image sensor points. It is within the scope of the invention to combine a plurality of partial sensors, in particular a plurality of adjacent partial sensors, of the sensor surface of the image sensor to form a pixel (also called an image sensor point), and in particular to form an average value of the measurement values of the associated partial sensors.

The radiation field is produced in method step A by an active or passive radiation source. The use of a radiation source, in particular a two-dimensionally emitting radiation source, for producing the spatially inhomogeneous radiation field therefore lies within the scope of the invention. The use of a radiation source which is passive and reflects or transmits, preferably reflects, radiation of at least one active illumination radiation source likewise lies within the scope of the invention.

It is assumed that within the duration of the recording of the first and second image sets, the radiation field has a constant relative intensity distribution, or a relative intensity distribution which is constant as a function of time in the scope of the measurement inaccuracy to be achieved, which means that the intensity changes overall only by a factor and remains constant in relative terms between the individual locations of the radiation field. The absolute intensity of the radiation field likewise preferably remains constant, or is monitored during the recording of the image sets so that a correction of the recorded intensity values may subsequently be carried out.

The intensity of the radiation field is therefore positionally relatively constant, at least within the duration of the recording of the first and second image sets, so that the intensity ratio between two arbitrary locations of the radiation field is constant as a function of time during this duration.

Advantageously, the course of at least one movement path, preferably of both movement paths, is determined from the position-resolved images. In this way, exact specification of the first and second movement paths by corresponding movement means may be obviated.

In order to increase the accuracy, it is advantageous for each group of evaluation lines to comprise at least 5, in particular at least 10, preferably at least 50 evaluation lines.

A particularly simple configuration is obtained when the relative movement is produced in method steps B and D in such a way that the evaluation lines of a group extend parallel to one another, and particularly preferably are formed in a straight line. The method is not however restricted to such a configuration, and there may be nonrectilinear and/or nonparallel evaluation lines of a group in particular because of rotational movements between the radiation source and the image sensor and/or perspective effects. Advantageously, however, the evaluation lines of a group have no points of intersection with one another. This simplifies the evaluation.

The method according to the invention is suitable for many applications. In particular, it is advantageous for a calibration, in particular a white image correction, of the image sensor to be carried out by the method.

Along the evaluation lines, which are part of the system of equations set up, proportionality factors are determined for each image point. In the case of white image correction, these correspond to the image point-specific sensitivity of the imaging system. The white image correction is carried out on this basis according to known methods.

It is within the scope of the invention for each recording of an image set to be corrected by a dark current correction according to known methods. In this case, an image, or preferably an image set, is recorded without exposure of the image sensor and averaged over the image points. Each image of the image set is corrected by subtracting this dark image.

The raw image recordings of the camera are preferably corrected for the dark current by subtracting the dark current components and then corrected for the white image by dividing the respective image point values by the image point proportionality factors.

The method according to the invention is suitable for use with any spatially inhomogeneous radiation fields, preferably temporally constant spatially inhomogeneous radiation fields. Advantageously, the radiation field is emitted actively or passively by a radiation surface. In this way, a relative movement between the radiation surface on the one hand and the image sensor on the other hand may be formed straightforwardly.

The method according to the invention is in particular suitable for determining the positional inhomogeneity of the radiation surface.

Preferably, the radiation surface is imaged onto the image sensor by imaging optics, particularly preferably by an objective.

When a passive radiation surface is used, it preferably receives radiation from at least one, particularly preferably exactly one, active radiation generator.

The radiation surface is preferably a diffusely reflective radiation surface, so that diffusely scattered radiation always impinges on the image sensor for different angle settings between the radiation surface and the image sensor.

When a radiation generator is used to act on the radiation source formed as a passive radiation surface, it is advantageous for the radiation field to be stationary relative to the radiation generator during the first relative movement and during the second relative movement. In particular, it is advantageous for the radiation surface and the radiation generator to be stationary relative to one another during the first and second relative movements.

Preferably, at least one of the measurement paths, particularly preferably both measurement paths, is/are determined from the associated image sets, in particular as will be described below: in order to determine the measurement path, the instant at which the characteristic gray value occurs over the duration of the recording is determined for each location. The instant is preferably defined by the index of the recording, which runs proportionally to the actual time. Along the movement direction, instants increasing in value are determined, corresponding to the chronological sequence of the application of the characteristic gray value. Due to the integrity of the radiation field, the application as a function of time within a measurement path runs with a proportional time offset, which is referred to below as the front of the local maxima.

The chronological sequence is preferably analyzed in a plurality of steps by determining gradients of first and second order, so that the movement direction of the inhomogeneous radiation field is determined. In particular, the evaluation preferably comprises the following steps: determination of the gradient field g of the chronological sequence of the application. Calculation of the direction angle from g. Determination of a further gradient field g' from the direction angle field. Determination of the local movement direction from the regions with gradient lengths greater than a limit value (g'>x) from this image. Determination of the local movement direction from the regions with gradient lengths less than the limit value (g'<x) from the first gradient field g. The movement direction of the measurement path is therefore determined with the aid of the gradients as a function of time.

Advantageously, each image set comprises at least 50, in particular at least 100, preferably at least 1000 position-resolved images, in order to reduce the susceptibility to error and increase resolution. In particular, it is advantageous for the number of position-resolved images of each image set to be equal to or preferably greater than the number of image points of the image sensor along a diagonal of the sensor field of the image sensor.

BRIEF DESCRIPTION OF THE DRAWINGS

Further advantageous features and embodiments will be explained below with the aid of the figures and an exemplary embodiment. Schematic views to illustrate an exemplary embodiment of the method according to the invention for the determination of an intensity distribution are represented in the figures.

DETAILED DESCRIPTION

By the use of a radiation surface 1, a spatially inhomogeneous radiation field of electromagnetic radiation is produced. In the present case, the radiation surface 1 is formed as an optical display which emits light in the visible range and therefore produces an inhomogeneous radiation field. In one variant of the exemplary embodiment, the radiation surface 1 is formed as a diffusely reflective surface which receives radiation of a radiation generator, for example of a light source.

The radiation surface 1 lies in the recording region of an image sensor 2 formed as a position-resolving camera, the radiation surface 1 being imaged by an objective 2a onto a position-resolving sensor, in the present case a CMOS chip or alternatively a CCD chip of the image sensor 2.

A spatially inhomogeneous radiation field of the radiation surface 1 is therefore produced in a method step A, the radiation surface 1 representing the passive radiation source in the present exemplary embodiment.

Figure 1:
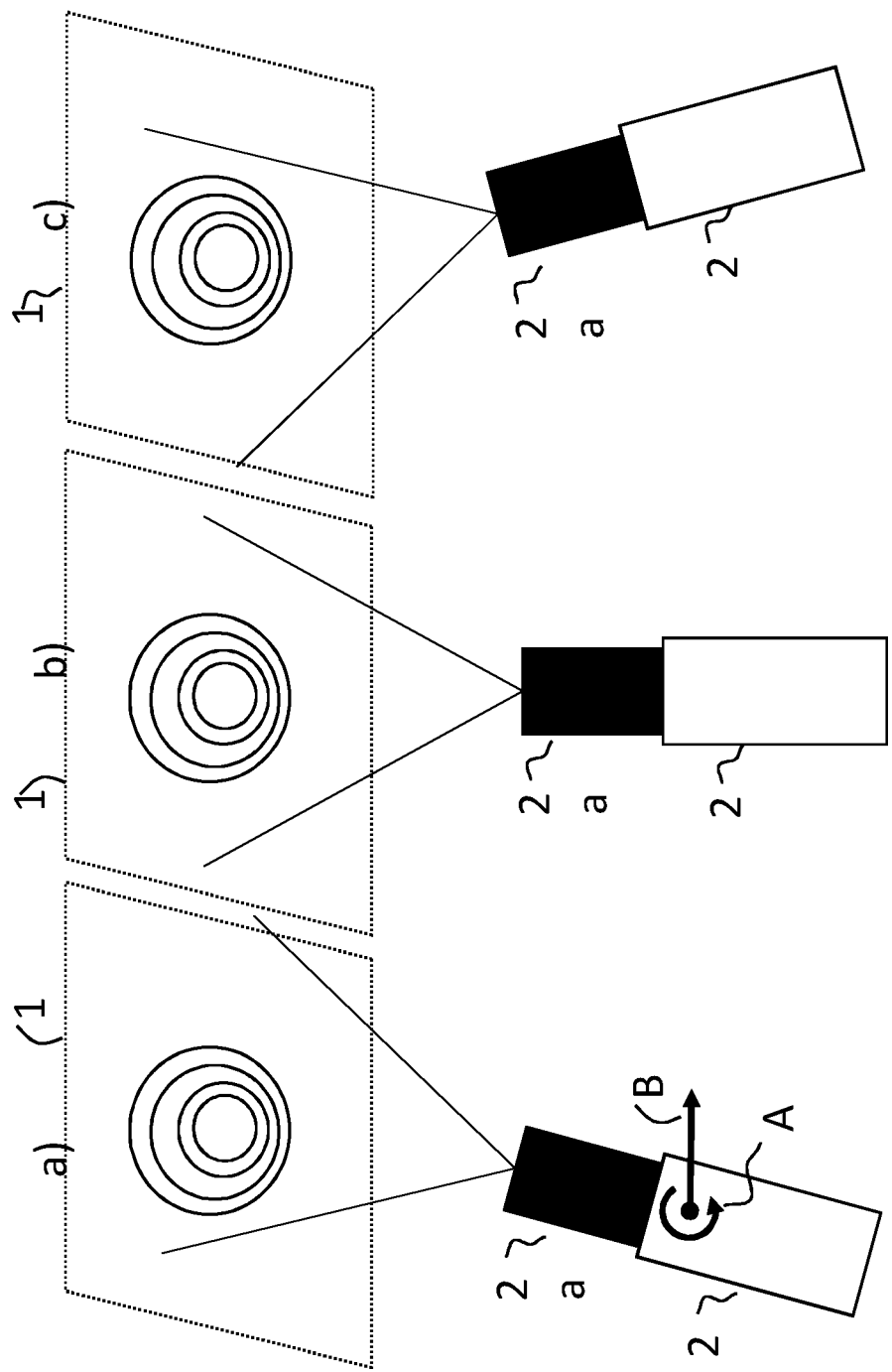
FIG. 1 schematically shows the image sensor rotated about an axis A perpendicular to the plane of the drawing.

In a method step B, a relative movement is produced between the image sensor 2 and the radiation surface 1. As schematically represented in FIG. 1, the image sensor 2 is rotated about an axis A perpendicular to the plane of the drawing in FIG. 1. By way of example, three different positions of the image sensor 2 relative to the radiation surface 1 are represented next to one another in FIG. 1. In each of the positions represented, a recording is made of a position-resolved image of the radiation field of the radiation surface 1 by the image sensor 2, so that a first image set comprising a multiplicity of position-resolved images is obtained.

The inhomogeneous radiation field is denoted by circles lying inside one another, which schematically represent lines of equal intensity.

Figure 2:
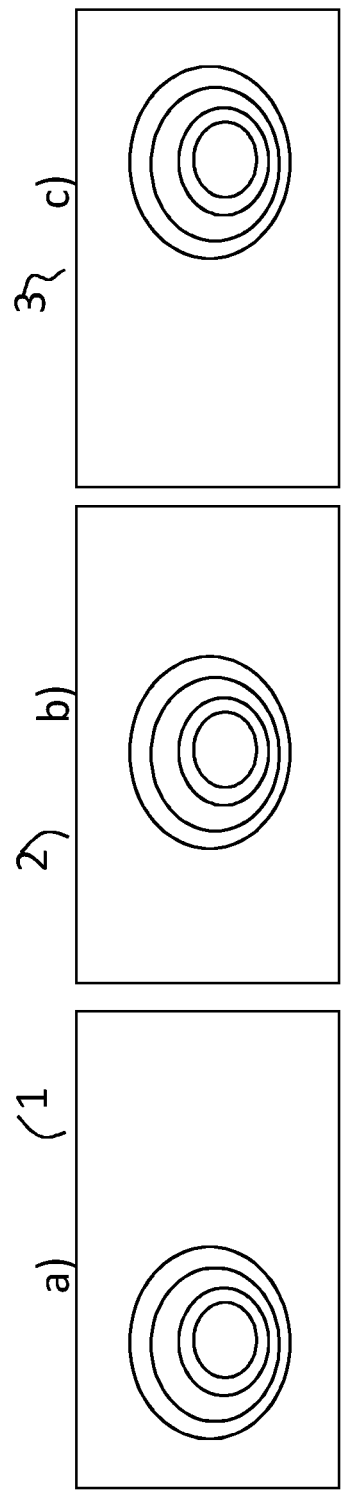
FIG. 2 schematically shows three images a to c of the first image set comprising position-resolved images during the relative movement along the first measurement path.

The three images a to c of the first image set comprising position-resolved images during the relative movement along the first measurement path are schematically represented in FIG. 2.

The intensities of the radiation field are constant as a function of time since the spatially inhomogeneous radiation field produced actively by the radiation surface 1 does not change as a function of time. Because of the relative movement produced in method step B, the intensity distribution, in the present case schematically represented by rings lying inside one another, in the multiplicity of position-resolved images of the first image set which are recorded in method step C is recorded at different places in the image space of the camera, as may be seen in FIG. 2.

Figure 3:
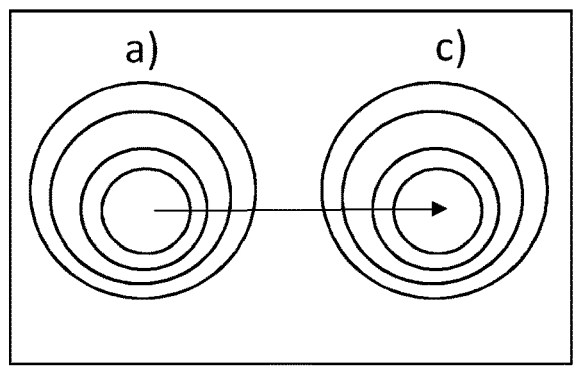
FIG. 3 schematically shows an image space of the camera that corresponds to a movement over the image sequence from position a to position c.

In the image space of the camera, this therefore corresponds to a movement over the image sequence from position a to position c, as schematically represented in FIG. 3, even though in the present case the camera moves relative to the radiation surface 1 but the radiation field on the radiation surface does not move.

In real applications, the recorded image sequence comprises a multiplicity of position-resolved images, in particular at least ten, preferably at least fifty, particularly preferably at least one hundred position-resolved images of the first image set, in the present case 2900. For simpler comprehension, the image set is restricted to three position-resolved images in the exemplary embodiment described.

Figure 4:
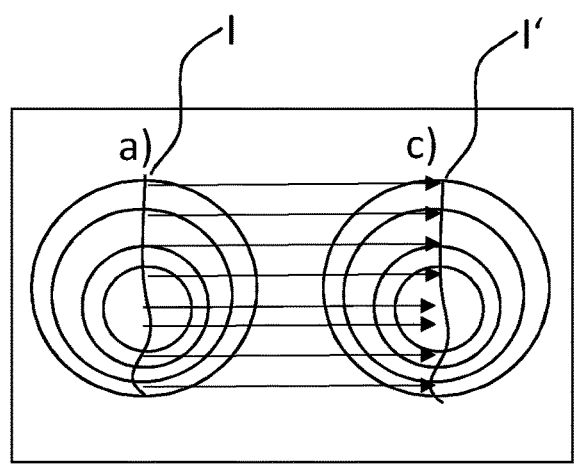
FIG. 4 schematically shows intensity values are registered for the position-resolved images a and c of the first image set along a line.

For a point of a predetermined intensity, the displacement of the radiation field in the image space of the camera therefore leads to a displacement of this point because of the relative movement of the first path movement. It is therefore possible to form lines of constant irradiation intensity that reproduce the path movement of a reference point, which is stationary in the radiation field, in the image space of the camera. FIG. 4 represents by way of example the fact that, in the present case, intensity values are registered for the position-resolved images a and c of the first image set along a line 1. These intensity values are also reproduced in the same sequence in the position-resolved image c, but spatially shifted in the image space of the camera at the place of the line 1' represented. The individual displacement lines, respectively represented as an arrow, of values of equal intensity between image a and image c represent evaluation lines.

In a method step D, a second relative movement now takes place between the image sensor and the radiation source, this being done in the present case by displacing the image sensor along a path approximately perpendicularly to the first translational displacement carried out. In this case as well, a positional shift of the radiation field, which in the present case is approximately perpendicular to the positional shift due to the first relative movement, takes place in the image space of the camera.

Figure 5:
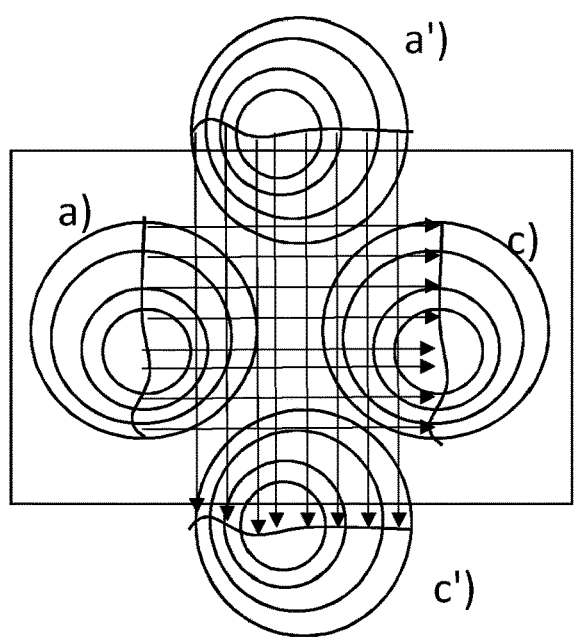
FIG. 5 schematically shows images a and c of the first image set and images a' and c' of the second image set comprising the multiplicity of position-resolved images of the radiation field.

In a method step E, a second image set comprising a multiplicity of position-resolved images is recorded by the image sensor. In FIG. 5, images a and c of the first image set and images a' and c' of the second image set comprising the multiplicity of position-resolved images of the radiation field are represented schematically, the images of the first image set having been recorded during the movement along the first measurement path and the images of the second image set correspondingly having been recorded during the movement along the second measurement path.

For the movement along the second measurement path, in a similar way to FIG. 4, it is also possible to determine lines of constant intensity as evaluation lines, which are correspondingly represented in FIG. 5 as vertical arrows between the positions a' and c' that are approximately perpendicular to the approximately horizontal evaluation lines according to FIG. 4.

In FIG. 5, the horizontal evaluation lines respectively represented as an arrow therefore form the first group of evaluation lines, and the vertical evaluation lines, likewise respectively represented as an arrow, therefore form the second group of evaluation lines. Each evaluation line of the first group has a point of intersection with each evaluation line of the second group.

At these points of intersection, a determination of the relative intensity distribution takes place in a method step B.

This leads to the aforementioned system of equations, which allows normalization of the lines with respect to one another.

The normalization of the evaluation lines with respect to one another in the present example leads to a matrix of the relative sensitivity of the image points of the camera sensor. All image points covered by the lines determined are part of this matrix. This may extend beyond the intersection region of the evaluation lines from the two groups. Preferably, the matrix covers all image points of the image sensor.

The matrix of the relative sensitivity is preferably normalized to the maximum value 1. This sensitivity matrix is referred to according to the prior art as a white image. The correction of the camera chip is carried out according to the prior art by dividing an image recording by the white image, in which case the raw image may already have been corrected for the dark current beforehand.

In a further advantageous configuration of the method, a radiation field is applied to the image sensor without upstream imaging optics in order to determine the fixed perturbation pattern of an image sensor. Evaluation steps A-G are similarly carried out and evaluated.

As a further modified exemplary embodiment, the characterization of a radiation field of the radiation surface may be carried out without calibration of the image sensor. Preferably, to this end the image sensor is not rotated about an axis but is moved along a translational relative movement parallel to the radiation surface. This makes it possible to carry out the characterization at constant viewing angles in relation to the movement direction. By way of example, this is denoted in FIG. 1 at A by the vector B denoted. A first image sequence, which is schematically represented in FIG. 2, is recorded during the movement.

The courses of the evaluation lines of the first and second groups are determined in a similar way to the description above. In an intermediate step, the indices of the chronological sequence of the recording of the characteristic gray values are now determined along the evaluation lines, which leads to the velocity profile of the relative movement along the evaluation line.

In a next step, an image sensor point, or a subgroup of image sensor points, which is intersected by the respective evaluation line is selected for each evaluation line. Because of the imaging optics of the camera, this image sensor point has the property of imaging the radiation surface with a constant viewing angle. By suitable selection of image sensor elements, different angles of viewing the radiation surface may be determined from the data set of a measurement.

With the aid of the velocity profile over the evaluation lines, the relative displacement and the surface element, imaged at each instant by the selected image sensor element, of the radiation surface are determined. Using known techniques, a suitable grid of intensity values from the data set is projected onto the radiation surface, for example by homography (projected transformation) and linear interpolation between defined grid points. This intermediate step is carried out for the first and second image sets. The resulting grids of the projected evaluation lines are evaluated in a similar way to the image sensor. Points of intersection between the evaluation lines of the first group and of the second group are determined, from which a system of equations that is solved by known minimization techniques, for example the method of least squares, is set up.

The solution of the minimization in each case gives a proportionality factor for the intensity values along a respective evaluation line. A relative intensity distribution of the radiation surface in the defined grid is determined by applying the proportionality factors.

For radiation surfaces whose emission characteristic differs greatly from Lambertian behavior, it is advantageous and lies within the scope of the invention to record a plurality of image sets with parallel relative movements of a movement main direction and to use image points with small viewing angle deviations for the evaluation. Furthermore, in this case it is likewise advantageous to restrict the viewing angle range in the image sets of the transversely extending measurement paths by selection of suitable image points.

LIST OF REFERENCE SIGNS 1 radiation surface
2 image sensor
2a objective

The invention claimed is:
1. A method for optical determination of an intensity distribution, comprising method steps:
   a) producing a spatially inhomogeneous radiation field of electromagnetic radiation by an active or passive radiation source;
   b) producing a first relative movement between a position-resolving image sensor (2) and the radiation source, so that the radiation field moves along a first measurement path over a sensor field of the image sensor, so that the image sensor (2) is scanned by a first measurement path region of the radiation field;
   c) recording a first image set comprising a multiplicity of position-resolved images of the radiation field by the image sensor during the first relative movement;
   d) producing a second relative movement between the image sensor (2) and the radiation source, so that the radiation field moves along a second measurement path over the sensor field of the image sensor, so that the image sensor (2) is scanned by a second measurement path region of the radiation field,
      the second measurement path being different to the first measurement path and being selected such that the first movement path is not parallel to the second movement path at least in some regions;
   e) recording a second image set comprising a second multiplicity of position-resolved images of the radiation field by the image sensor during the second relative movement;
   f) evaluating the position-resolved images of the first and second image sets at least at points of intersection, locations of which are defined by evaluation lines, a first group of evaluation lines being at least one of specified or determined within the first measurement path region and a second group of evaluation lines being at least one of specified or determined within the second measurement path region,
      at least the first group of evaluation lines comprising at least two evaluation lines which are at a distance from one another,
      and each said evaluation line of the first group having a point of intersection with at least one said evaluation line of the second group of evaluation lines,
      a characteristic gray value respectively being determined for each image set at least for each said point of intersection;

g) determining a relative intensity distribution at least on a subset of the points of intersection in order to characterize at least one of the image sensor or the radiation field.

2. The method as claimed in claim 1, wherein a course of at least one of the movement paths is determined from the position-resolved images.

3. The method as claimed in claim 1, wherein each said group of evaluation lines comprises at least 5 evaluation lines.

4. The method as claimed in claim 1, wherein the evaluation lines of each said respective group have no points of intersection with one another.

5. The method as claimed in claim 1, further comprising carrying out a calibration of the image sensor.

6. The method as claimed in claim 5, wherein the calibration is a white image correction.

7. The method as claimed in claim 1, wherein the radiation field is emitted actively or passively by a radiation surface (1).

8. The method as claimed in claim 7, further comprising determining a positional inhomogeneity of the radiation surface (1).

9. The method as claimed in claim 8, wherein the radiation surface (1) is imaged by imaging optics onto the image sensor.

10. The method as claimed in claim 9, wherein the radiation surface (1) is a passive radiation surface (1) and receives radiation from at least one active radiation generator.

11. The method as claimed in claim 10, wherein the radiation surface (1) is a diffusely reflective radiation surface (1).

12. The method as claimed in claim 10, wherein the radiation field is stationary relative to the radiation generator during the first relative movement and during the second relative movement.

* * * * *